United States Patent
Sethi et al.

(10) Patent No.: US 12,307,229 B2
(45) Date of Patent: May 20, 2025

(54) METHOD AND SYSTEM FOR DETERMINING A BOOT TIME DELAY FOR AN UPGRADE OF A COMPUTING DEVICE

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 185 days.

(21) Appl. No.: 17/699,461

(22) Filed: Mar. 21, 2022

(65) Prior Publication Data

US 2023/0297360 A1 Sep. 21, 2023

(51) Int. Cl.
G06F 8/65 (2018.01)
G06F 9/4401 (2018.01)
G06F 9/455 (2018.01)

(52) U.S. Cl.
CPC .............. *G06F 8/65* (2013.01); *G06F 9/4401* (2013.01); *G06F 9/455* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 5,668,801 A * | 9/1997 | Grunenfelder | H04Q 11/0478 370/253 |
| 7,472,385 B2 | 12/2008 | Chamberlain et al. | |
| 10,884,764 B1 * | 1/2021 | Pilkington | G06F 9/45508 |
| 11,341,233 B2 | 5/2022 | Shantharam et al. | |
| 2011/0125545 A1 * | 5/2011 | Lehmann | G06Q 10/109 707/769 |
| 2017/0048304 A1 * | 2/2017 | Singh | H04L 69/321 |
| 2018/0113728 A1 * | 4/2018 | Musani | G06F 11/362 |
| 2021/0326149 A1 * | 10/2021 | Runyan | G06F 1/3218 |
| 2021/0356561 A1 * | 11/2021 | Li | G01S 7/4095 |

* cited by examiner

*Primary Examiner* — Jae U Jeon
(74) *Attorney, Agent, or Firm* — Chamberlain, Hrdlicka, White, Williams & Aughtry; Aly Z. Dossa

(57) ABSTRACT

A method for upgrading a client device includes: performing an emulation to generate an application upgrade strategy to apply a plurality of application upgrades on a client device, in which the application upgrade strategy is associated with a plurality of emulated boot times; comparing the plurality of emulated boot times with an actual boot time obtained from the client device; determining, based on the comparison, a boot time delay; generating a final application upgrade strategy, in which the final application upgrade strategy specifies the boot time delay; and initiating upgrading of the client device using the final application upgrade strategy in response to feedback from a user.

13 Claims, 7 Drawing Sheets

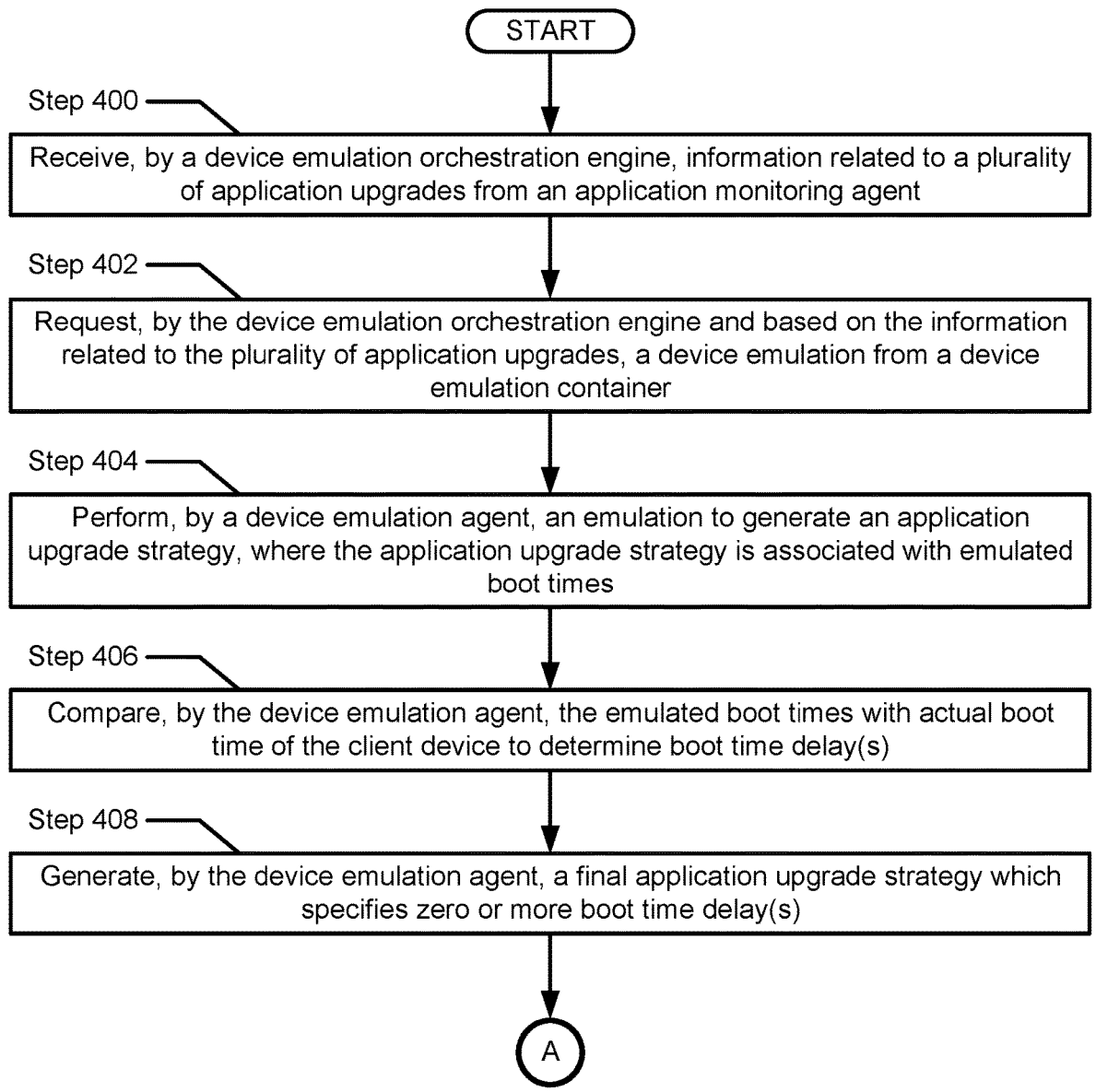
FIG. 4.1

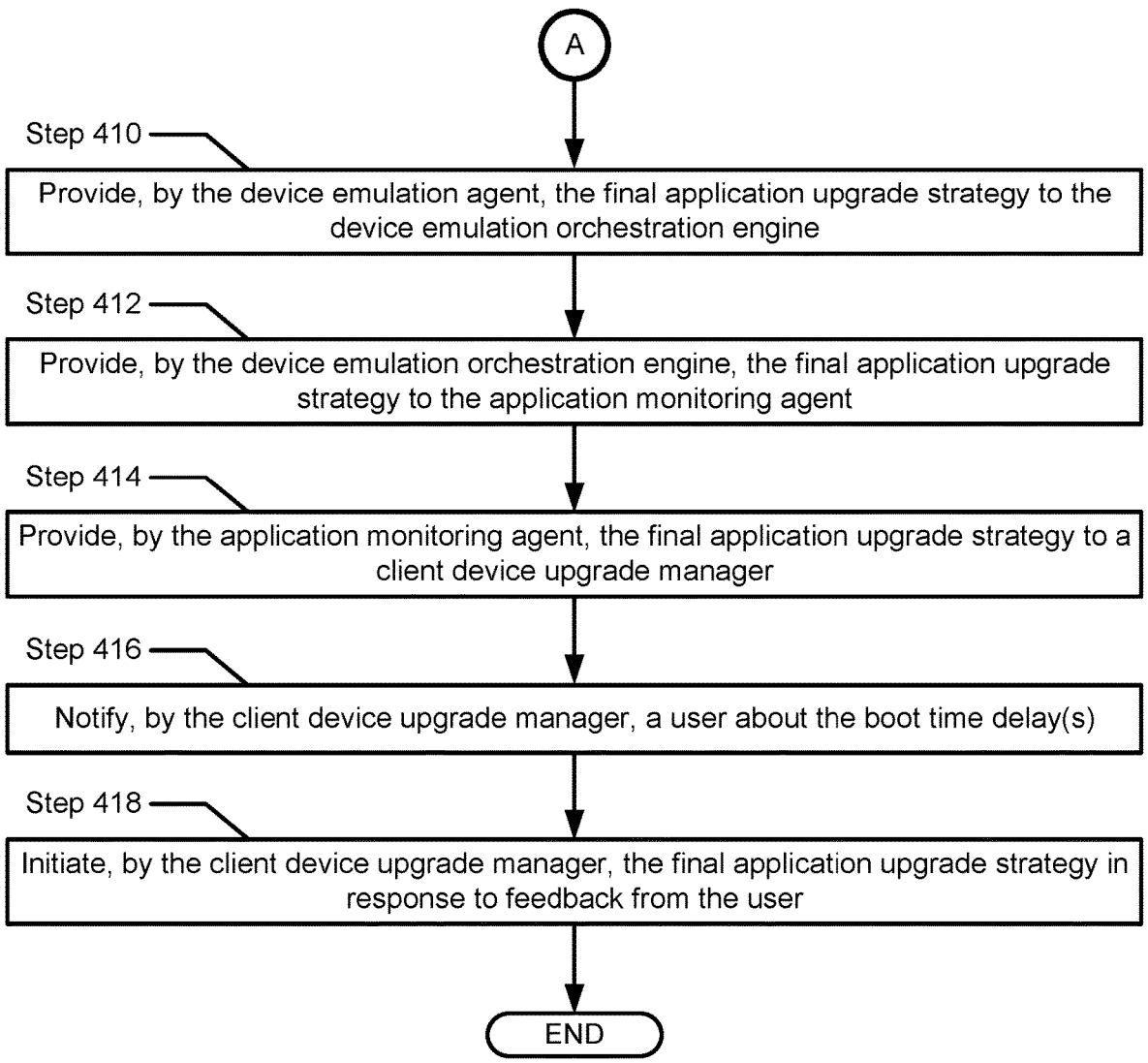
FIG. 4.2

US 12,307,229 B2

1

METHOD AND SYSTEM FOR DETERMINING A BOOT TIME DELAY FOR AN UPGRADE OF A COMPUTING DEVICE

BACKGROUND

Computing devices in a system may include any number of internal components such as processors, memory, and persistent storage. The computing devices may execute applications (e.g., software). Each application may be upgraded to newer versions to protect the computing devices from security vulnerabilities of the application.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1 and 4.2 show a method to determine a boot time delay for an upgrade of a computing device in accordance with one or more embodiments of the invention.

DETAILED DESCRIPTION

Figure 1:
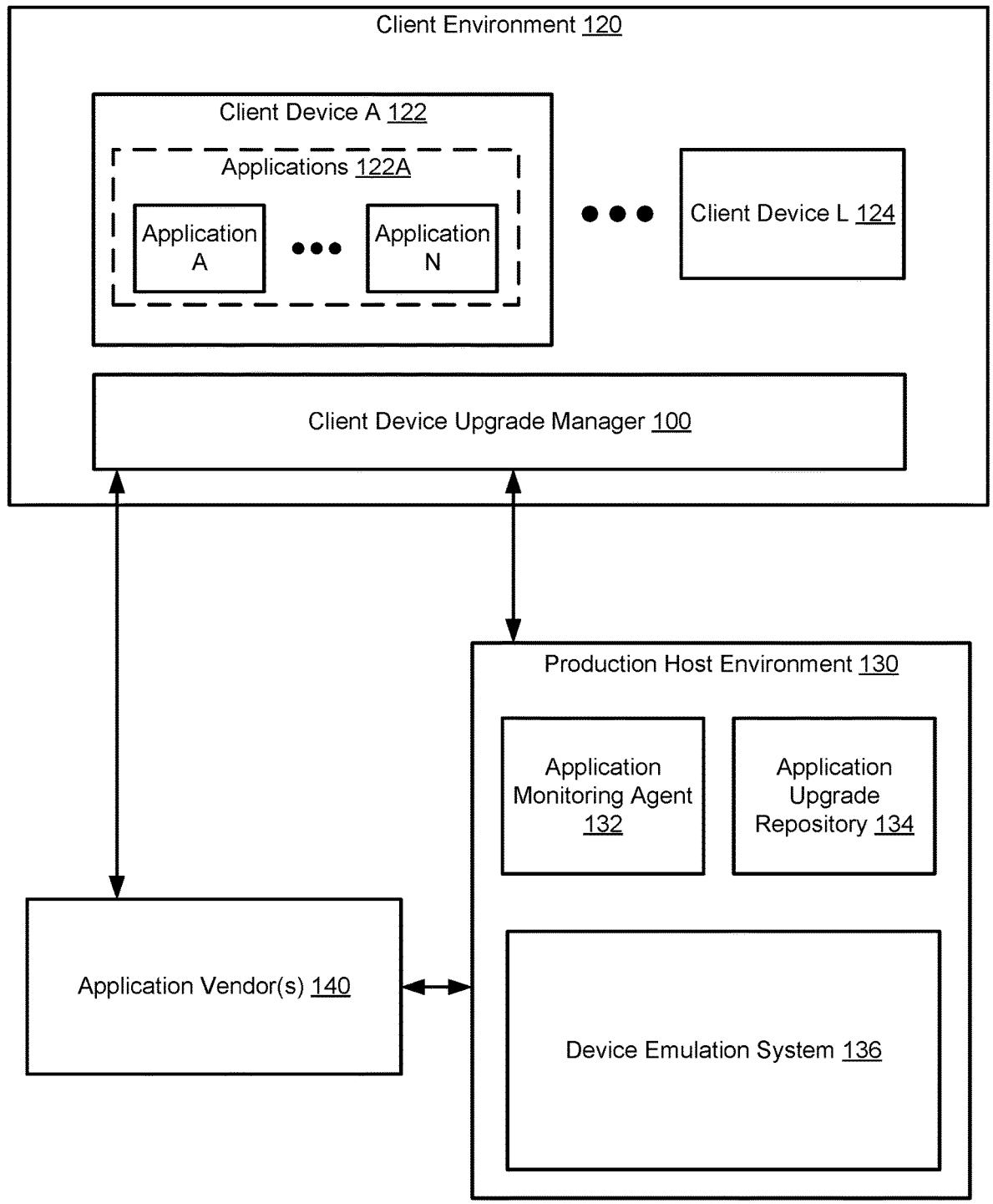
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a boot time of a computing device (e.g., a client device) is usually increased after an application upgrade is performed on the computing device. Typically, users restarting a computing device following the application upgrade may be unaware of this increased boot time. Embodiments of the invention relate to methods and systems for determining a boot time delay for an upgrade of a computing device. More specifically, various embodiments of the invention may receive information related to a plurality of application upgrades from an application monitoring agent. Based on the received information, a device emulation will be requested, and an emulation will be performed in response to generate an application upgrade strategy along with emulated (e.g., predicted) boot times. Boot time delay(s) may then be determined by comparing the emulated boot times with one or more actual boot times of the computing device. A final application upgrade strategy will then be generated based on the determined boot time delay(s). Finally, the user will be notified about the boot time delay(s). In response to feedback from the user based on the user's new knowledge of the boot time delay(s), the final application upgrade strategy will be initiated (e.g., instantiated, executed, etc.). This advantageously provides the user with a much clearer view about the restart process to be performed because the user will now be aware of the increased boot time associated with the restart process.

The following describes various embodiments of the invention.

FIG. 1 shows a diagram of a system in accordance with one or more embodiments of the invention. The system includes a client environment (120), one or more application vendors (140), and a production host environment (130). The system may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the client environment (120) may include client devices (client device A (122), client device L (124)) and a client device upgrade manager (100). The client devices (client device A (122), client device L (124)) and the client device upgrade manager (100) may be physical or logical devices, as discussed below.

In one or more embodiments of the invention, each client device (client device A (122), client device L (124)) may include one or more applications (122A). As shown in FIG. 1, the applications (122A) may include application A to application N. The applications (122A) may be logical entities executed using computing resources (not shown) of the client devices (client device A (122), client device L (124)). Each of the applications (122A) may perform similar or different processes. In one or more embodiments of the invention, the applications (122A) may provide services to users (e.g., clients (not shown)) of the client devices (client device A (122), client device L (124)). For example, the applications (122A) may host services and/or components. The services and/or components may be, for example but are not limited to: instances of databases, email servers, etc. The applications (122A) may host other types of services and/or components without departing from the scope of the invention.

Figure 6:
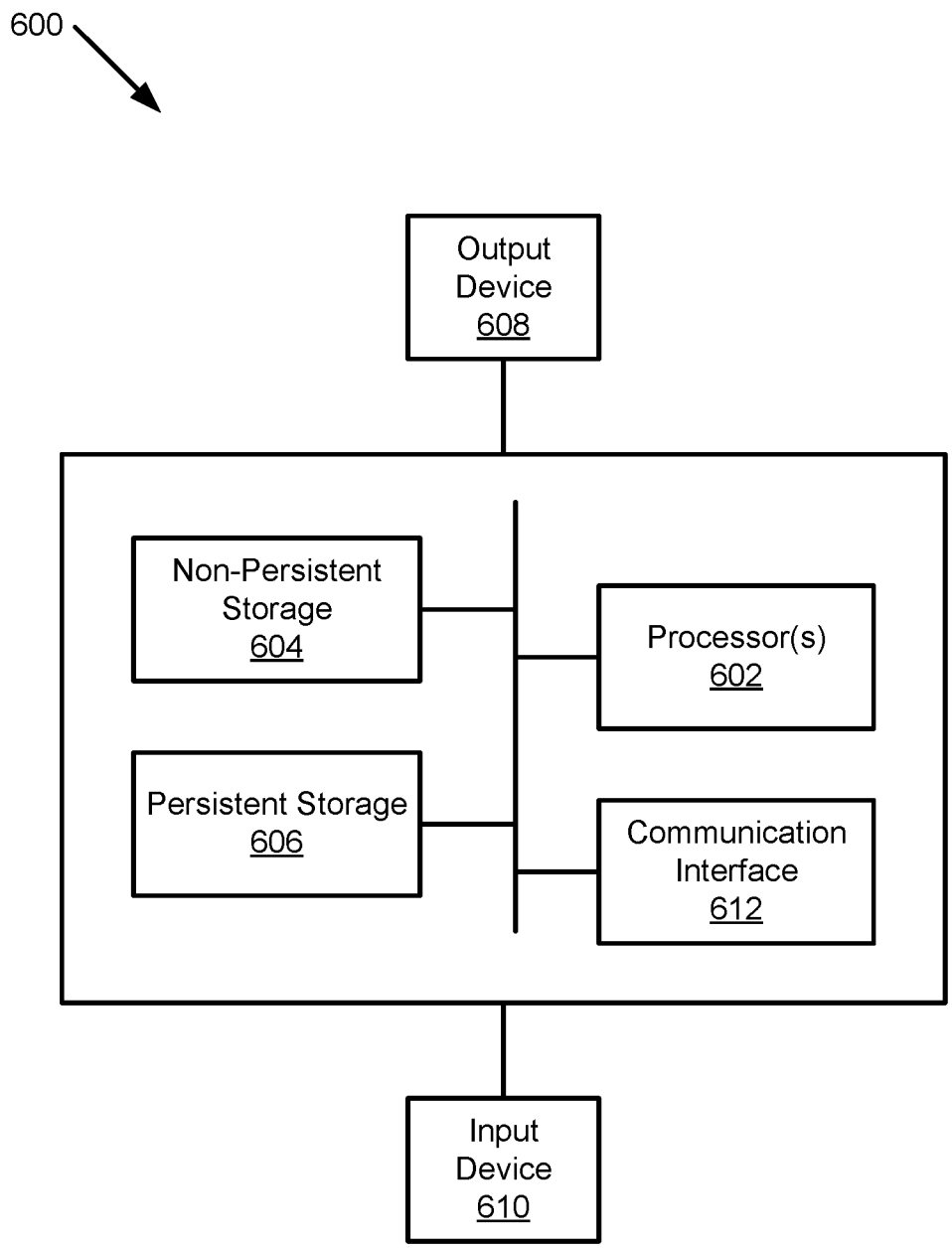
FIG. 6 shows a diagram of a computing device in accordance with one or more embodiments of the invention.

In one or more embodiments of the invention, each client device (client device A (122), client device L (124)) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client device (client device A (122), client device L (124)) described throughout this application.

Alternatively, in one or more embodiments of the invention, each client device (client device A (122), client device L (124)) may be implemented as a logical device. The logical device may utilize the computing resources of any number of computing devices to provide the functionality of each client device (client device A (122), client device L (124)) described throughout this application.

In one or more embodiments of the invention, the applications (122A) may be upgraded based on newer versions available for installation. The installation of application upgrades may be performed and/or otherwise initiated by the client device upgrade manager (100). The client device upgrade manager (100) may also periodically collect information (e.g., client device state and configuration information) from the client devices (client device A (122), client device L (124)).

In one or more embodiments of the invention, the applications (122A) may be implemented as computer instructions, e.g., computer code, stored on a persistent storage that when executed by a processor(s) of a computing device cause the computing device (e.g., 600, FIG. 6) to provide the functionality of the applications (122A) described throughout this application.

In one or more embodiments of the invention, the client device upgrade manager (100) may then send this information to the application vendor(s) (140) for technical support (e.g., recommendations and/or fixes for hardware and/or software failures) to the client devices (client device A (122), client device L (124)). The client device upgrade manager (100) may also identify the client devices (client device A (122), client device L (124)) that require an application upgrade. The application vendor(s) (140) may then provide one or more catalog files (described in more detail below) that specify the requirements of the identified client devices (client device A (122), client device L (124)) to the production host environment (130).

In one or more embodiments of the invention, the client device upgrade manager (100) may obtain the estimated time that one or more application upgrades may take. The client device upgrade manager (100) may obtain the application upgrade time estimation from the production host environment (130). The client device upgrade manager (100) may then provide the application upgrade time estimation and optimal time slots in which the application upgrade may be performed to the identified client devices (client device A (122), client device L (124)).

In one or more embodiments of the invention, the client device upgrade manager (100) may further include functionality of monitoring device configuration information of the client devices (client device A (122), client device L (124)). The device configuration information of the client devices (client device A (122), client device L (124)) may include, but it is not limited to: operating system information of a client device, the number of applications already installed to a client device, current versions of such applications already installed to a client device, processing power of a client device, etc. The device configuration information of the client devices (client device A (122), client device L (124)) may be provided to the production host environment (130).

The device configuration information of the client devices (client device A (122), client device L (124)) may also include other details without departing from the scope of the invention.

In one or more embodiments of the invention, the client device upgrade manager (100) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application.

Alternatively, in one or more embodiments of the invention, similar to the client devices (client device A (122), client device L (124)), the client device upgrade manager (100) may also be implemented as a logical device, as discussed above.

Turning back to the production host environment (130), in one or more embodiments of the invention, the production host environment (130) may include an application monitoring agent (132), an application upgrade repository (134), and a device emulation system (136). The production host environment (130) may include additional, fewer, and/or different components without departing from the scope of the invention.

In one or more embodiments of the invention, the production host environment (130) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

Alternatively, in one or more embodiments of the invention, similar to the client devices (client device A (122), client device L (124)), the production host environment (130) may also be implemented as a logical device, as discussed above.

In one or more embodiments of the invention, the application upgrade repository (134) may store versions of the application upgrade(s). The application upgrade repository (134) may be updated by the application vendor(s) (140) based on newer versions of the application upgrade(s) being available. The application upgrade repository (134) may further store catalog files related to the application upgrade(s) to be installed. The catalog files may include, for example, but are not limited to: a compatible device model, a minimum application version for the application upgrade to be installed, a compatible operating system (and corresponding version of such operating system), an upgrade sequence, etc.

In one or more embodiments of the invention, the application monitoring agent (132) may push the application upgrade(s) to the client device upgrade manager (100). The application monitoring agent (132) may also obtain a list of the client devices (client device A (122), client device L (124)) that are managed by the client device upgrade manager (100). The application monitoring agent (132) may further obtain the information related to the application(s) already installed to those client devices (client device A (122), client device L (124)) from the client device upgrade manager (100).

In one or more embodiments of the invention, the application monitoring agent (132) may monitor the application upgrade repository (134) to identify the application upgrade(s) available in the application upgrade repository (134). The application monitoring agent (132) may then identify one or more client devices (client device A (122), client device L (124)) that are compatible with the application upgrade based on the catalog files related to the application upgrade in the application upgrade repository (134).

In one or more embodiments of the invention, in response to an emulated application upgrade (e.g., an emulation of an application upgrade that is to be performed on an emulated client device (e.g., device A emulation (224), described below in reference to FIG. 2)), the application monitoring agent (132) may initiate an estimation of performing the application upgrade on one or more of the client devices (client device A (122), client device L (124)). The application upgrade estimation(s) may then be provided to the client device upgrade manager (100).

In one or more embodiments of the invention, the application monitoring agent (132) may further send information related to the application upgrade to a device emulation orchestration engine (e.g., 210, FIG. 2), which is part of the device emulation system (136). In one or more embodiments of the invention, the information related to the application upgrade may include, but it is not limited to: application version of an application upgrade, supported operating system version(s) for an application upgrade, etc. The information related to the application upgrade may also include other details without departing from the scope of the invention.

In one or more embodiments of the invention, the application monitoring agent (132) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application.

Alternatively, in one or more embodiments of the invention, similar to the client devices (client device A (122), client device L (124)), the application monitoring agent (132) may also be implemented as a logical device, as discussed above.

In one or more embodiments of the invention, the device emulation system (136) may be a system of device emulation containers (e.g., device emulation container A (220), device emulation container L (230), described below in reference to FIG. 2) that may be configured to emulate the client devices (client device A (122), client device L (124)). The emulation of the client devices (client device A (122), client device L (124)) may be used for applying the application upgrade to the emulated devices and measuring application upgrade metrics.

In one or more embodiments of the invention, the application upgrade metrics may include, but they are not limited to: the time taken to complete the application upgrade, the number of reboots required after performing the application upgrade, etc. The application upgrade metrics may also include other details not listed above without departing from the scope of the invention. Additional details regarding the device emulation system (136) are described below in reference to FIG. 2.

In one or more embodiments of the invention, the device emulation system (136) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application.

Alternatively, in one or more embodiments of the invention, similar to the client devices (client device A (122), client device L (124)), the device emulation system (136) may also be implemented as a logical device, as discussed above.

Figure 2:
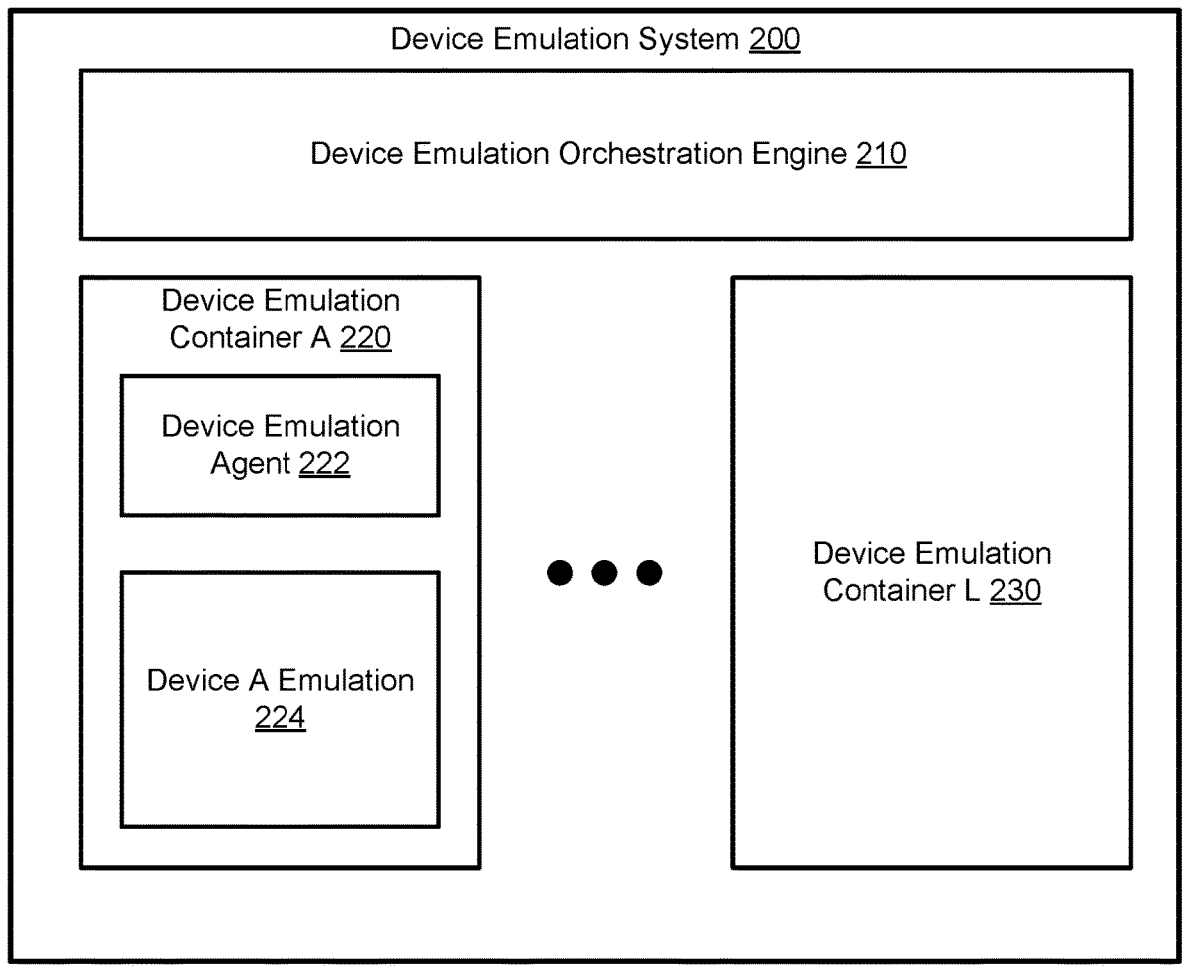
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an example of the device emulation system (e.g., 136, FIG. 1) discussed above, in which the device emulation system (e.g., 136, FIG. 1) emulates the client devices (e.g., client device A (122), client device L (124), FIG. 1). The device emulation system (200) may include the device emulation orchestration engine (210) and one or more device emulation containers (device emulation container A (220), device emulation container L (230)). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container L (230)). For example, the device emulation orchestration engine (210) may receive request(s) from the application monitoring agent (e.g., 132, FIG. 1) to emulate an application upgrade on an emulated client device (e.g., device A emulation (224)). The device emulation orchestration engine (210) may then initiate the emulation of the client devices (e.g., client device A (122), client device L (124), FIG. 1) and the application upgrade.

In one or more embodiments of the invention, the device emulation orchestration engine (210) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

Alternatively, in one or more embodiments of the invention, similar to the client devices (e.g., client device A (122), client device L (124), FIG. 1), the device emulation orchestration engine (210) may also be implemented as a logical device, as discussed above.

Continuing the discussion of FIG. 2, in one or more embodiments of the invention, the device emulation containers (device emulation container A (220), device emulation container L (230)) may include a device emulation agent (222) that monitors the application upgrade(s) executing on the emulated client device (device A emulation (224)). More specifically, the device emulation agent (222) may monitor, for example, the application upgrade(s) performed on the emulated client device (device A emulation (224)) to measure the time taken to perform each application upgrade and to track the number of reboots performed after each application upgrade.

In one or more embodiments of the invention, the monitored parameters may then be used to evaluate the application upgrade(s) and, based on this evaluation, to determine whether the application upgrade(s) should be pushed out to the client device (e.g., client device A (122), client device L (124), FIG. 1).

In one or more embodiments of the invention, the device emulation agent (222) may perform an emulation to generate an application upgrade strategy for the emulated client device (device A emulation (224)). In one or more embodiments of the invention, the application upgrade strategy may be generated based on the available application upgrades for the client device (e.g., client device A (122), client device L (124), FIG. 1) in the application upgrade repository (e.g., 134, FIG. 1).

In one or more embodiments of the invention, the application upgrade strategy (not shown) may be generated in an iterative manner. For example, multiple application upgrade strategies may be evaluated to find the most efficient application upgrade strategy for performing the application upgrades on the emulated client device (device A emulation (224)). For this purpose, hardware capabilities of the emulated client device (device A emulation (224)), including, but not limited to, storage capability of the random access memory, processing power of one or more processors may be taken into account while generating the application upgrade strategies. Other hardware capabilities of the emulated client device (device A emulation (224)) not listed above may also be taken into account without departing from the scope of the invention.

Figure 3:
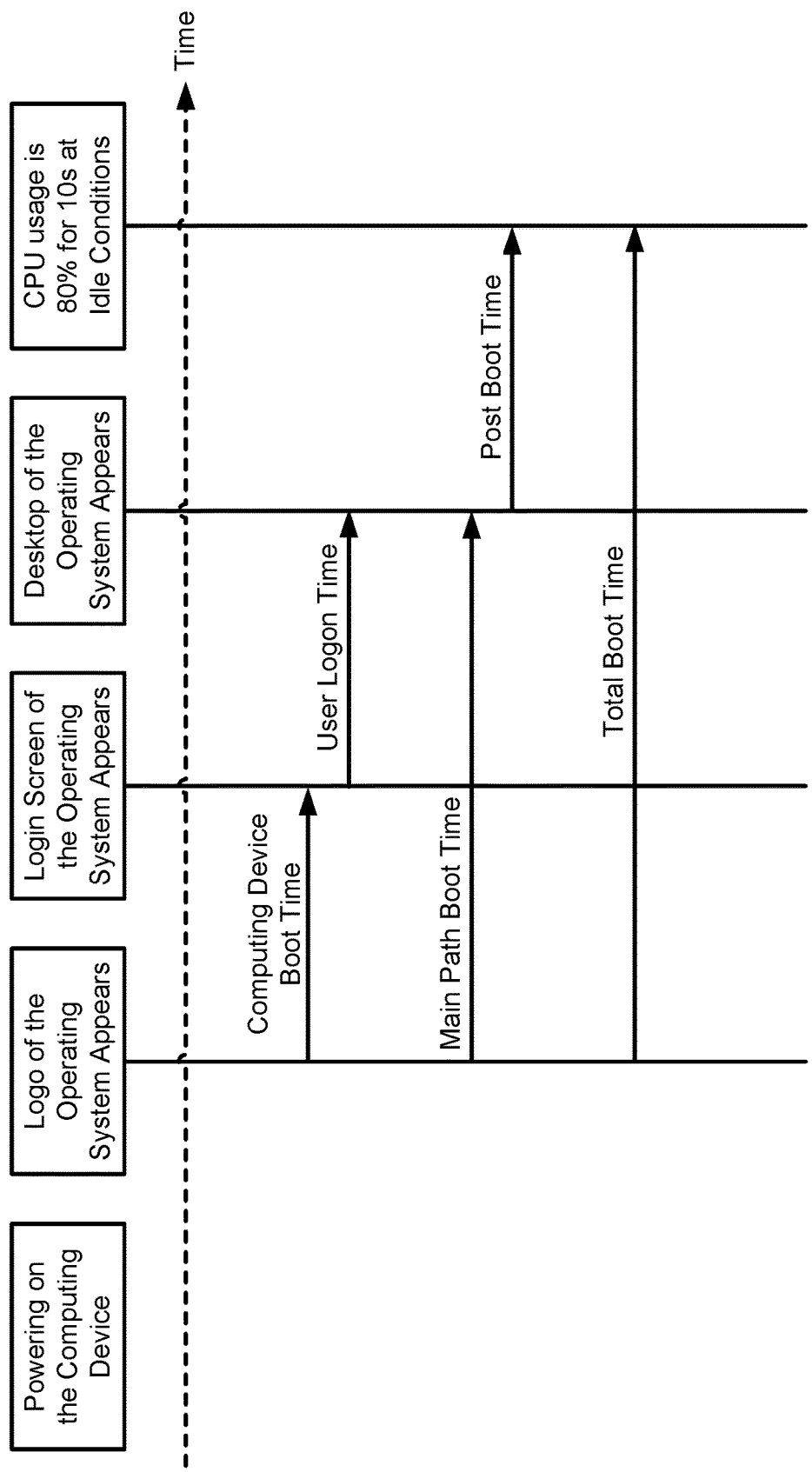
FIG. 3 shows a diagram of actions performed by components of a computing device over time.

Turning to FIG. 3, FIG. 3 shows a diagram of actions performed by components of a computing device (e.g., 122, FIG. 1; 600, FIG. 6) over time to boot the computing device. Considering a scenario illustrated in FIG. 3, at a predetermined point in time, the computing device is powered on. In one or more embodiments of the invention, the computing device may be powered on by the user. In response to powering on the computing device, a logo of the operating system (OS) may be displayed to the user through, e.g., a visualization module (not shown). In one or more embodiments of the invention, the visualization module may be implemented may be implemented in hardware (i.e., circuitry), software, or any combination thereof.

In one or more embodiments of the invention, using the visualization module, a login screen of the OS may then be displayed to the user. In one or more embodiments, as shown in FIG. 3, the time between the appearance of the logo to the appearance of the login screen may be referred to herein as a "computing device boot time." In one or more embodiments, once the login screen is displayed, the user may enter information (i.e., data) (e.g., username, password, etc.) on a graphical user interface (GUI) generated by the visualization module. The data that can be entered on the GUI are not limited those listed above and may also include other types of information without departing from the scope of the invention.

After the user has successfully logged-in, a desktop of the OS may be displayed. In one or more embodiments, as shown in FIG. 3, the time between the appearance of the login screen to the appearance of the desktop may be referred to herein as a "user logon time." Additionally, as shown in FIG. 3, the time between the appearance of the logo until the appearance of the desktop may be referred to herein as a "main path boot time."

In one or more embodiments of the invention, even if the desktop is displayed, the user may still not have complete access to the functionalities provided by the desktop and/or may not yet perform any operations using any of the icons (e.g., applications) presented on the desktop. For example, if the user attempts to run an application when the OS is not yet fully operational, the application may take longer than expected to be launched.

In one or more embodiments, when the central processing unit (CPU) usage of the computing device is, for example, around 80% for 10 seconds at idle conditions, the user may then have full access to the functionalities provided by the desktop to perform one or more operations (i.e., the OS has become fully operational). In one or more embodiments, as shown in FIG. 3, the time between the appearance of the desktop until the OS becomes fully operational may be referred to herein as a "post boot time." Additionally, as further shown in FIG. 3, the time between the appearance of the logo until the OS becomes fully operational may be referred to herein as a "total boot time" (also used herein interchangeably with the term "boot time").

FIGS. 4.1 and 4.2 show a method to determine a boot time delay (e.g., a delay in the boot time) after installing upgrade of a computing device in accordance with one or more embodiments of the invention. While the various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be performed by, for example, the application monitoring agent (e.g., 132, FIG. 1), the device emulation orchestration engine (e.g., 210, FIG. 2), the device emulation container (e.g., device emulation container A (220), device emulation container L (230)), and the device emulation agent (e.g., 222, FIG. 2). Other components of the system illustrated in FIG. 1 may also contribute to the performance of the method shown in FIG. 4.1 without departing from the scope of the invention.

In Step 400, information related to a plurality of application upgrades from an application monitoring agent is received. In one or more embodiments of the invention, the information related to the plurality of application upgrades may be received by the device emulation orchestration engine.

In one or more embodiments of the invention, prior to sending the information related to the plurality of application upgrades to the device emulation orchestration engine, the application monitoring agent may have received this information from the application upgrade repository (e.g., 134, FIG. 1). Additionally, the device configuration information of the client device that is to be upgraded using the plurality of application upgrades (e.g., a client device that requested the plurality of application upgrades) may be obtained prior to receiving the information related to the plurality of application upgrades.

In one or more embodiments of the invention, the information related to the plurality of application upgrades may include, but it is not limited to: application version information of each application upgrade, computing device information of the client device, etc. The information related to the plurality of application upgrades may also include other details not listed above without departing from the scope of the invention.

In one or more embodiments of the invention, the device configuration information of the client device may specify the configuration of the client device that requested the plurality of application upgrades. The configuration of the client device may include, for example: a current version of the operating system of the client device, the amount of memory available for the client device, a number of applications executing on the client device, the amount of available persistent storage of the client device, etc. Other types of client device configurations not listed above may also be specified in the device configuration information without departing from the scope of the invention.

In Step 402, a device emulation is requested from a device emulation container. In one or more embodiments of the invention, based on the information related to the plurality of application upgrades, the device emulation may be requested by the device emulation orchestration engine.

In one or more embodiments of the invention, the device emulation request may specify applying the plurality of application upgrades to an emulated device of a corresponding client device. The device emulation request may also specify monitoring the installation of the plurality of application upgrades to obtain the application upgrade metrics. Other tasks not listed above may also be specified in the device emulation request without departing from the scope of the invention. Details regarding the application upgrade metrics are described above in reference to FIG. 1.

In one or more embodiments of the invention, while performing the device emulation of the corresponding client device, a set of upgrade estimations for each application upgrade may be obtained from the device emulation agent. The set of upgrade estimations may specify, for example, an estimated completion time for each application upgrade to be applied to the client device. In one or more embodiments of the invention, the set of upgrade estimations may further specify the number of restarts required after all application upgrades have been applied. Other parameters not listed above may also be specified by the set of upgrade estimations without departing from the scope of the invention. The set of upgrade estimations may then be provided to the device emulation orchestration engine.

Continuing the discussion of FIG. 4.1, in Step 404, an emulation to generate an application upgrade strategy is performed. In one or more embodiments of the invention, the emulation to generate the application upgrade strategy may be performed by the device emulation agent. During the generation of the application upgrade strategy, the set of upgrade estimations and the application upgrade metrics may be considered.

In one or more embodiments of the invention, during the generation of the application upgrade strategy, the device emulation agent may obtain emulated boot times from a client device emulation (e.g., device A emulation (224), FIG. 2). To generate the emulated boot times, the client device emulation may obtain application logs and system logs of the emulated client device. In one or more embodiments of the invention, the application logs may include, but are not limited to: information related to a task scheduler history, information related to a domain name system (DNS) change, etc. Additionally, the system logs may include, but are not limited to: information related to a client device's CPU usage, information related to a newly detected universal serial bus (USB) device, etc.

In one or more embodiments of the invention, based on the obtained application logs and the system logs, the OS of the client device emulation may access a system log, in which the system log specifies one or more emulated boot times of the client device emulation. The emulated boot times of the client device emulation may then be provided to the device emulation agent.

In one or more embodiments of the invention, the application upgrade strategy may then be associated with the emulated boot times. In the context of one or more embodiments, the application upgrade strategy being associated with the emulated boot times means that one or more application upgrades in the application upgrade strategy is mapped to a corresponding emulated boot time. For example, an application upgrade (e.g., App. C) in the application upgrade strategy may be associated with a corresponding emulated boot time of a respective client device emulation.

In Step 406, the emulated boot times are compared with the actual boot time of the client device to determine boot time delay(s). In one or more embodiments of the invention, the comparison may be performed by the device emulation agent.

In one or more embodiments of the invention, the boot time delay may be a difference between an emulated boot time and an actual boot time. In one or more embodiments of the invention, at least one of the emulated boot times includes an emulated main path boot time and an emulated post boot time. Similarly, the actual boot time includes a main path boot time and a post boot time. Details regarding the main path boot time and the post boot time are described above in reference to FIG. 3.

In one or more embodiments of the invention, the client device may monitor the user's booting of the client device to generate the actual boot time. For this purpose, based on the obtained application logs and the system logs, the OS of the client device may access a system log specifying the actual boot time of the client device. The actual boot time may then be obtained by the client device upgrade manager and provided to the device emulation orchestration engine. The actual boot time of the client device may then be provided to the device emulation agent by the device emulation orchestration engine.

Next, in one or more embodiments of the invention, by comparing the emulated boot times with the actual boot time, the device emulation agent may specify (e.g., calculate) zero (0) or more boot time delay(s). For example, the device emulation agent may specify a zero boot time delay if the emulated boot time is identical to the actual boot time (e.g., the emulated boot time after the upgrade took the same amount of time as a previously recorded actual boot time indicating that the boot time delay is 0 ms).

As another example, the device emulation agent may specify a boot time delay when the booting of the user was delayed (e.g., the emulated boot time after the upgrade took longer than a previously recorded actual boot time indicating that the boot time delay is 540000 ms).

In Step 408, a final application upgrade strategy is generated. In one or more embodiments of the invention, the final application upgrade strategy may be generated by the device emulation agent. The final application upgrade strategy may include the boot time delay(s), as discussed above in Step 406. More specifically, the final application upgrade strategy may include the boot time delay(s) as delay information. The delay information may also include a plurality of application upgrades associated with the boot time delay(s) (e.g., the application upgrades that caused the boot time delay(s)). Additional details regarding the final application upgrade strategy are described below in reference to FIG. 5.

Turning now to FIG. 4.2, the method shown in FIG. 4.2 may be performed by, for example, the application monitoring agent (e.g., 132, FIG. 1), the device emulation orchestration engine (e.g., 210, FIG. 2), the device emulation agent (e.g., 222, FIG. 2), and the client device upgrade manager (e.g., 100, FIG. 1). Other components of the system illustrated in FIG. 1 may also contribute to the performance of the method shown in FIG. 4.2 without departing from the scope of the invention.

In Step 410, the final application upgrade strategy may be provided to the device emulation orchestration engine by the device emulation agent. In Step 412, the final application upgrade strategy may be provided to the application monitoring agent by the device emulation orchestration engine. In Step 414, the final application upgrade strategy may be provided to the client device upgrade manage by the application monitoring agent. In one or more embodiments of the invention, the final application upgrade strategy may then be provided to the user by the client device upgrade manager.

In Step 416, the user is notified about the boot time delay(s) (e.g., by the client device upgrade manager). For example, the boot time delay(s) may be displayed to the user on a GUI. In one or more embodiments of the invention, the GUI may be displayed on a display of a display engine (not shown), in which the display engine is operatively connected to the computing device (e.g., 600, FIG. 6). The display engine may be implemented using hardware, software, or any combination thereof. The boot time delay(s) may be displayed in any visual format which would allow the user to easily read and parse the listed information.

In one or more embodiments of the invention, the display engine may receive outputs generated by the client device upgrade manager and aggregate these outputs into a user-friendly display format (e.g., a notification on a startup screen of the client device). The outputs may include, but are not limited to: the number of application upgrades, the number of reboots after performing the application upgrades, zero or more boot time delay(s), the names of each application upgrade, purpose of each application upgrade, etc.

In Step 418, in response to feedback from the user, the final application upgrade strategy may be initiated. In one or more embodiments of the invention, the final application upgrade strategy may be initiated by the client device upgrade manager. For example, based on the final application upgrade strategy, as a first item, the performance of App. F may be implemented.

In one or more embodiments of the invention, after at least a portion of the final application upgrade is performed, the client device may be restarted. In this manner, the effect(s) of the completed application upgrades can be applied to the client device.

In one or more embodiments of the invention, during restarting of the client device (e.g., over the main path boot time), the boot time delay may be displayed as a delay notification on the startup screen of the client device. In one or more embodiments, the delay notification may only be displayed before restarting the client device (e.g., before the logo of the OS appears).

In one or more embodiments of the invention, the method ends following Step 418. The embodiments shown in FIGS. 4.1 and 4.2 advantageously informs users (before or during the restart of the client device) about the boot times (and the boot time delays) required to apply the effect(s) of one or more application upgrades. This also advantageously allows a user to make an informed decision (e.g., deferring restart of the client device after the application upgrades are completed) when the boot time delays are longer than what the user is expecting.

Figure 5:
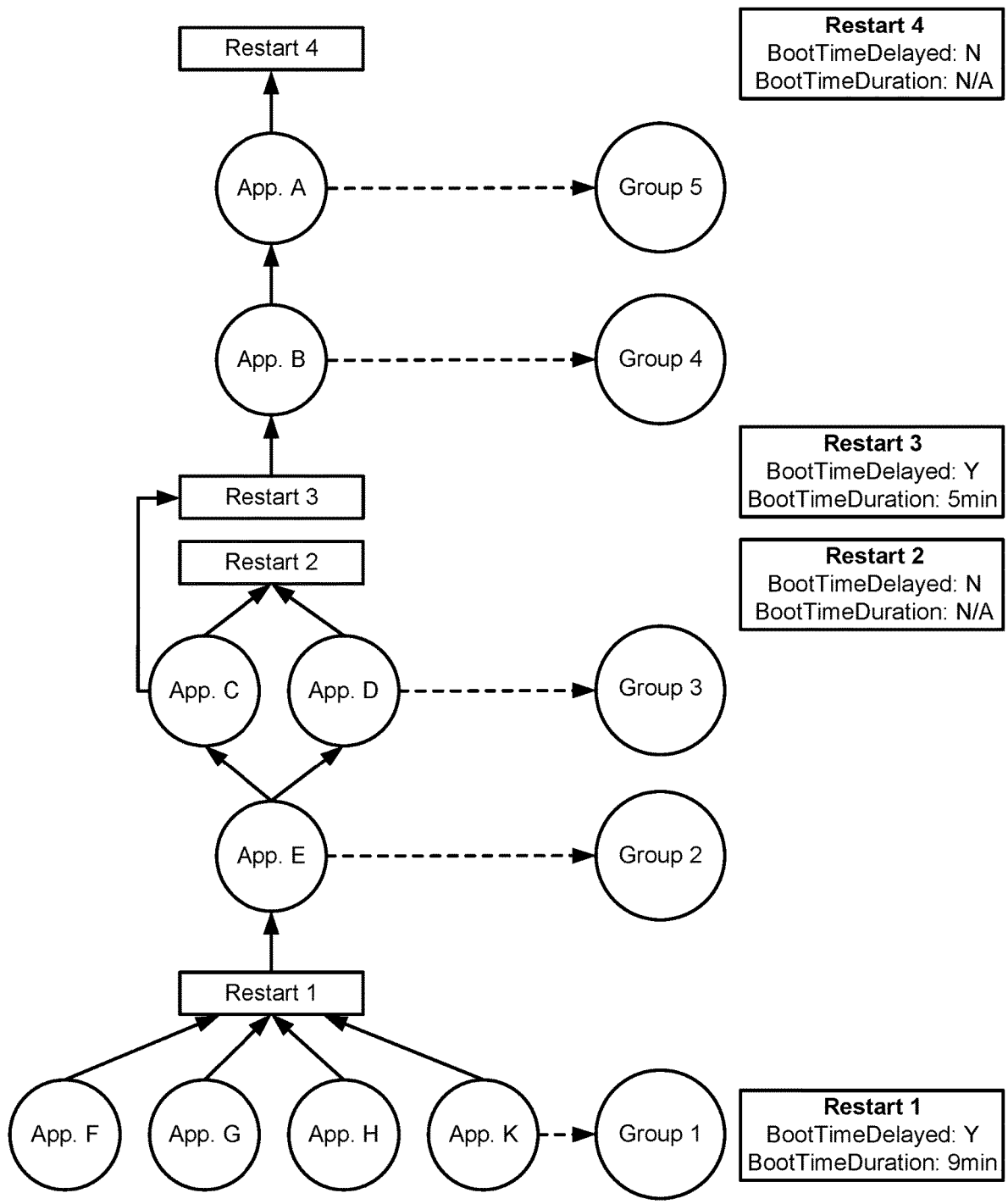
FIG. 5 shows a final application upgrade strategy in accordance with one or more embodiments of the invention.

Turning now to FIG. 5, FIG. 5 shows a final application upgrade strategy in accordance with one or more embodiments of the invention. In one or more embodiments of the invention, the final application upgrade strategy may include one or more application upgrades to be performed (e.g., App. F, App. G, App. H, etc.). The final application upgrade strategy may also include one or more restarts (e.g., Restart 1, Restart 2, Restart 3, etc.) to be performed on one or more of the client devices (e.g., client device A (122), client device L (124), FIG. 1).

In one or more embodiments of the invention, related ones of the application upgrades (e.g., App. F, App. G, App. H, App. K) (also referred to herein as "related application upgrades") for a client device may be classified and referred to herein as "a group of application upgrades" (e.g., Group 1). In this manner, a restart (e.g., Restart 1) may be performed to apply the effect(s) of the group of application upgrades (e.g., Group 1) to the client device. Additionally, a restart (e.g., Restart 3) may also be performed to apply the effect(s) of an individual application upgrade (e.g., App. C) to the client device.

In one or more embodiments of the invention, the related application upgrades may be classified based on, for example, their names and/or their types (e.g., corrective application upgrade, functional application upgrade). The related application upgrades may also be classified based on other parameters not listed above without departing from the scope of the invention.

In one or more embodiments of the invention, the final application upgrade strategy may further include delay information. As shown in FIG. 5, the delay information may include, but it is not limited to: an identifier indicating whether the boot time of the client device is delayed (e.g., BootTimeDelayed: Yes (Y), BootTimeDelayed: No (N)), a plurality of application upgrades associated with the boot time delay (e.g., Group 1, App. C), a plurality of emulated boot times associated with the plurality of application upgrades (e.g., BootTimeDuration: 9 min. (or 540000 in ms)), the name of the restart associated with the plurality of application upgrades (e.g., Restart 1), etc.

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN), such as the Internet, mobile network, or any other type of network) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for upgrading a client device, the method comprising:
   receiving, by a device emulation orchestration engine executing in a device emulation system, information related to a plurality of application upgrades from an application monitoring agent executing in a production host environment,
      wherein the device emulation system executes in the production host environment;
   sending, by the engine and based on the information, a client device emulation request to a device emulation container executing in the device emulation system;
   performing, upon receiving the request and by a device emulation agent executing in the container, an emulation of an application upgrade of the plurality of application upgrades that is to be performed on the client device using an emulated client device to obtain an emulated boot time,
      wherein the device emulation agent monitors the emulation of the application upgrade on the emulated client device to obtain the emulated boot time;
   obtaining a boot time delay, using the device emulation agent, based on a difference between the emulated boot time and an actual boot time received from the client device,
      wherein the client device executing in a client environment and the device emulation system are operably connected to each other over a combination of wired and wireless connections,
      wherein the boot time delay is displayed to a user using a graphical user interface (GUI) to notify the user about the boot time delay,
      wherein the boot time delay is displayed using the GUI after the user powers on the client device and before a logo of an operating system executing on the client device appears on the GUI;
   providing, by the device emulation agent, the boot time delay to a client device upgrade manager executing in the client environment; and
   initiating upgrading of the client device using the client device upgrade manager and based on the boot time delay in response to feedback from the user.

2. The method of claim 1, further comprising:
   prior to initiating upgrading of the client device based on the boot time delay, providing the boot time delay to the user.

3. The method of claim 2, wherein providing the boot time delay to the user comprises displaying delay information, wherein the delay information specifies the boot time delay and a plurality of application upgrades associated with the boot time delay.

4. The method of claim 1, wherein the notifying of the user about the boot time delay comprises displaying a delay notification, wherein the delay notification specifies the boot time delay.

5. The method of claim 1, wherein the client device monitors booting of the client device to generate the actual boot time.

6. The method of claim 5, wherein the monitoring by the client device comprises obtaining log files of the client device.

7. The method of claim 1, wherein the emulated boot time comprises an emulated main path boot time and an emulated post boot time.

8. The method of claim 1, wherein the actual boot time comprises a main path boot time and a post boot time.

9. A system for upgrading a client device, the system comprising:
   the client device;
   a client device upgrade manager, wherein the client device and the client device upgrade manager form a client environment (CE); and
   a production host environment (PHE) comprising a device emulation agent executing in a device emulation container, a device emulation system, and an application monitoring agent, wherein the PHE is operably connected to the CE, wherein the device emulation agent is configured to:
   perform, upon receiving a client device emulation request, an emulation of an application upgrade of a plurality of application upgrades that is to be performed on the client device using an emulated client device to obtain an emulated boot time,
      wherein the device emulation agent monitors the emulation of the application upgrade on the emulated client device to obtain the emulated boot time,
         wherein a device emulation orchestration engine executing in the device emulation system receives information related to the plurality of application upgrades from the application monitoring agent,
         wherein, based on the information, the engine sends the request to the container executing in the device emulation system;
   obtain a boot time delay based on a difference between the emulated boot time and an actual boot time received from the client device of the CE,
      wherein the client device and the device emulation system are operably connected to each other over a combination of wired and wireless connections,
      wherein the boot time delay is displayed to a user using a graphical user interface (GUI) to notify the user about the boot time delay,
      wherein the boot time delay is displayed using the GUI after the user powers on the client device and before a logo of an operating system executing on the client device appears on the GUI;
   provide the boot time delay to the client device upgrade manager,
      wherein the client device upgrade manager initiates upgrading of the client device based on the boot time delay in response to feedback from the user.

10. The system of claim 9, wherein the client device monitors booting of the client device to generate the actual boot time.

11. The system of claim 10, wherein the monitoring by the client device comprises obtaining log files of the client device.

12. The system of claim 9, wherein the emulated boot time comprises an emulated main path boot time and an emulated post boot time.

13. The system of claim 9, wherein the actual boot time comprises a main path boot time and a post boot time.

\* \* \* \* \*